United States Patent
Ressler et al.

(10) Patent No.: US 12,161,107 B2
(45) Date of Patent: Dec. 10, 2024

(54) AEROSOL DISPENSER

(71) Applicant: Lamplight Farms Incorporated, Menomonee Falls, WI (US)

(72) Inventors: Kyle Ressler, West Bend, WI (US); Ben Yu, New Berlin, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 201 days.

(21) Appl. No.: 17/738,708

(22) Filed: May 6, 2022

(65) Prior Publication Data

US 2022/0354104 A1 Nov. 10, 2022

Related U.S. Application Data

(60) Provisional application No. 63/185,160, filed on May 6, 2021.

(51) Int. Cl.
*A01M 29/12* (2011.01)
*B65D 83/26* (2006.01)
*B65D 83/38* (2006.01)

(52) U.S. Cl.
CPC .......... *A01M 29/12* (2013.01); *B65D 83/262* (2013.01); *B65D 83/388* (2013.01)

(58) Field of Classification Search
CPC .............................. A01M 29/12; B65D 83/262
See application file for complete search history.

(56) References Cited

U.S. PATENT DOCUMENTS

| | | | | |
|---|---|---|---|---|
| 5,228,594 A * | 7/1993 | Aslin | ....................... | B67D 7/20 222/63 |
| 6,039,212 A * | 3/2000 | Singh | .................... | B65D 83/262 222/30 |
| 6,182,904 B1 * | 2/2001 | Ulczynski | ............. | B05B 1/3053 239/69 |
| 6,267,297 B1 * | 7/2001 | Contadini | ............... | B05B 12/02 239/326 |
| 7,246,919 B2 * | 7/2007 | Porchia | ...................... | A61L 9/03 362/276 |
| 7,320,418 B2 * | 1/2008 | Sassoon | .................. | G04C 23/44 222/402.1 |
| 7,618,151 B2 * | 11/2009 | Abbondanzio | ......... | A61L 9/037 362/253 |
| 8,061,562 B2 * | 11/2011 | Carpenter | ............ | B65D 83/267 239/70 |
| 8,181,826 B2 * | 5/2012 | Wainwright | ........ | A01M 1/2038 43/2 |
| 8,245,877 B2 * | 8/2012 | Ophardt | ............... | A47K 5/1217 222/63 |
| 8,494,351 B1 * | 7/2013 | Hayes | ....................... | A61L 9/03 392/397 |
| 8,556,122 B2 * | 10/2013 | Helf | ..................... | B65D 83/262 222/61 |
| 8,579,453 B1 * | 11/2013 | Cohen | ..................... | A61L 9/037 362/418 |

(Continued)

*Primary Examiner* — Vishal Pancholi
*Assistant Examiner* — Randall A Gruby
(74) *Attorney, Agent, or Firm* — GableGotwals; David G. Woodral

(57) ABSTRACT

A repellent system with a housing containing a pressurized cannister containing a repellent and having a release valve, and an actuator in the housing that activates the release valve to dispense repellent.

7 Claims, 7 Drawing Sheets

(56) References Cited

U.S. PATENT DOCUMENTS

| | | | |
|---|---|---|---|
| 8,590,743 B2* | 11/2013 | Beland | B65D 83/46 |
| | | | 222/1 |
| 8,616,735 B2* | 12/2013 | Van Dyn Hoven | F21V 9/00 |
| | | | 362/255 |
| 8,622,242 B2* | 1/2014 | Pelfrey | A47K 5/1217 |
| | | | 250/221 |
| 8,881,945 B2* | 11/2014 | Gasper | A61L 9/125 |
| | | | 222/639 |
| 10,962,219 B2* | 3/2021 | Sawalski | F21V 23/001 |
| 11,754,279 B2* | 9/2023 | Sawalski | F21V 23/001 |
| | | | 362/96 |
| 2006/0221614 A1* | 10/2006 | Van Dyn Hoven | |
| | | | A47G 33/0854 |
| | | | 362/249.16 |
| 2011/0134628 A1* | 6/2011 | Pestl | F21V 33/004 |
| | | | 29/592.1 |
| 2015/0144713 A1* | 5/2015 | Formico | A01M 1/2044 |
| | | | 239/289 |
| 2022/0354105 A1* | 11/2022 | Ressler | A01M 1/2044 |
| 2023/0094264 A1* | 3/2023 | Li | A61L 9/122 |
| | | | 422/125 |
| 2024/0060637 A1* | 2/2024 | Sawalski | A01M 13/00 |

* cited by examiner

AEROSOL DISPENSER

CROSS-REFERENCE TO RELATED CASES

This application claims the benefit of U.S. provisional patent application Ser. No. 63/185,160, filed on May 6, 2021, and incorporates such provisional application by reference into this disclosure as if fully set out at this point.

FIELD OF THE INVENTION

This disclosure relates to insect repellent devices in general and, more specifically, to an insect repellent system for use with an outdoor lighting system.

BACKGROUND OF THE INVENTION

Outdoor spaces are more enjoyable when they can be rendered free of biting insects. Chemicals may be dispersed to achieve this end but existing solutions requires a user to periodically respray an area lest the repellent drift away or become diffuse and ineffective.

What is needed is a system and method for addressing the above and related issues.

SUMMARY OF THE INVENTION

The invention of the present disclosure, in one aspect thereof, comprises a repellent system with a housing containing a pressurized cannister containing a repellent and having a release valve, and an actuator in the housing that activates the release valve to dispense repellent.

The repellent may comprise metofluthrin. The actuator may be electrically powered. The release valve may be of the type that is compressed to release the repellent. The actuator may be a linearly actuating solenoid.

The system may have a battery powering the solenoid. In some embodiments the a power lead powers the solenoid, the power lead being connected to a string light.

An access panel may be provided in the housing allowing access to the pressurized container. A clip may be provided on the housing.

The invention of the present disclosure, in another aspect thereof, comprises a repellent system having a housing, an aerosol cannister in the housing containing an insect repellent dispensed via actuation of a valve on the aerosol cannister, an electrically powered actuator that selectively opens the valve to release repellent, a power supply, and a control circuit that energizes the electrically powered actuator with the power supply to cause the electrically powered actuator to open the valve.

The power supply may comprise a connection to a string light. In other embodiments, the power supply comprises a battery in the housing.

Actuation of actuation of a valve may comprise pressing of a valve. The actuator may be a linearly actuating solenoid. In some cases, the control circuit energizes the actuator to open the valve intermittently.

The repellent may comprise metofluthrin.

The system may comprise a user control that activates the control circuit. It may also include a sensor that causes the control circuit to energize the actuator to open the valve.

The invention of the present disclosure, in another aspect thereof, comprises a repellent system having an openable housing containing a user replaceable pressurized cannister containing a repellent, the repellent being released from the cannister upon depression of a valve associated with the cannister, and a solenoid that selectively depresses the valve under control of a control circuit. The repellent may comprise metofluthrin.

DETAILED DESCRIPTION OF THE PREFERRED EMBODIMENTS

In various embodiments, the present disclosure describes systems and methods for deploying an aerosol container (e.g., a pressurized canister) containing a repellent that is mounted inside of a dispenser that disperses the repellent into the air. As described in further detail below, such dispensers according to the present disclosure may be attached to or clipped onto string lights, integrated into string lights, attached to a pole torch, or tabletop torch. Devices of the present disclosure may also be free hanging or otherwise used or placed on their own. Power for operation or actuation of the device may be provided by line voltage, batteries, solar power, or a mechanical device (e.g., based on gravity, springs, wind up mechanisms, etc.).

Figure 1:
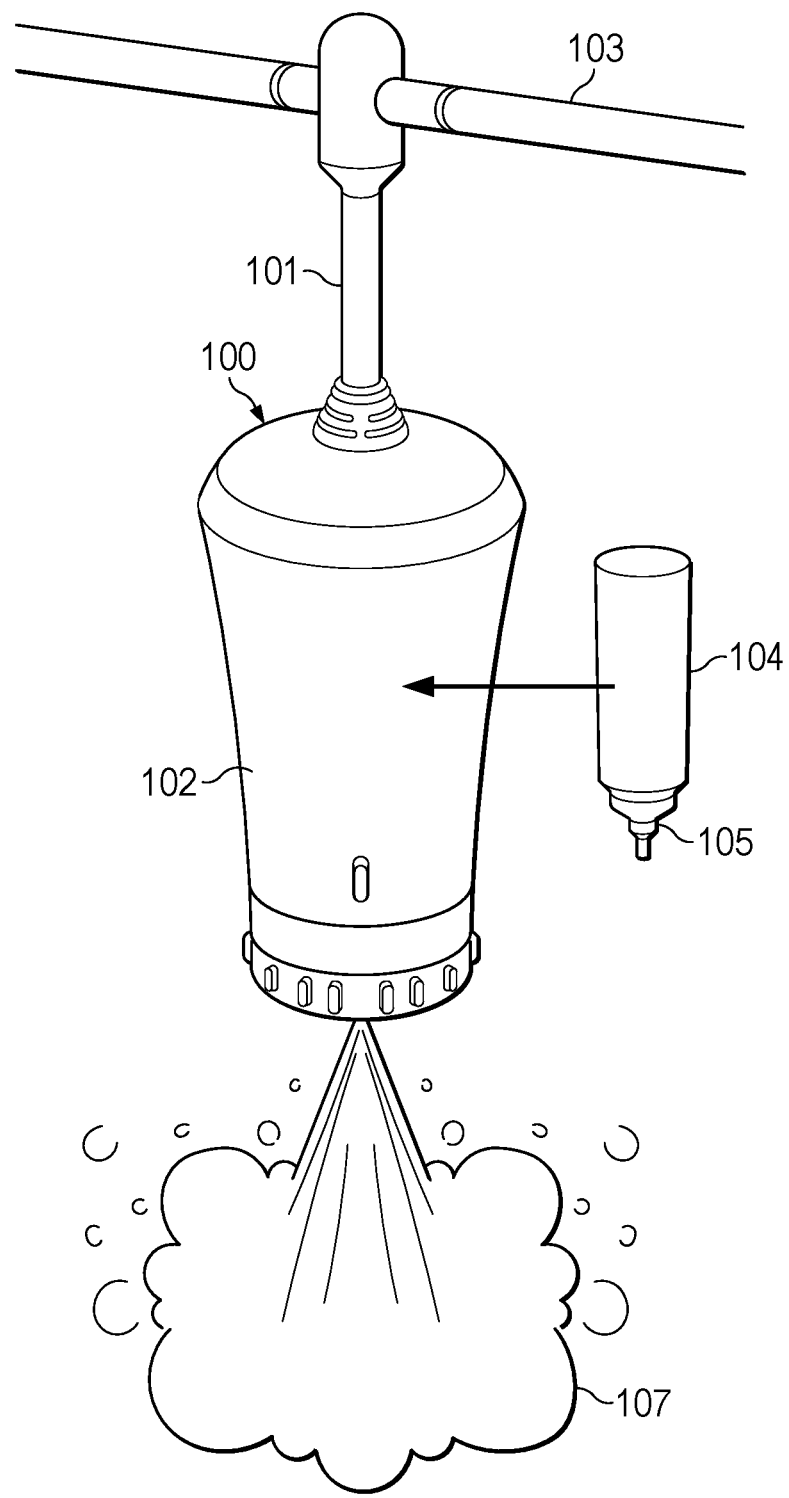
FIG. 1 is a perspective view of one embodiment of an aerosol repellent system according to aspects of the present disclosure.

Referring now to FIG. 1 is a perspective view of one embodiment of an aerosol repellent system 100 according to aspects of the present disclosure is shown. The system 100 may comprise a body, container, or housing 102 that houses a pressurized aerosol cannister 104. The cannister 104 is user replaceable in some embodiments. The cannister 104 may comprise a valve 105 for releasing he contents thereof. The valve 105 may be a spring loaded push type valve or another valve as is known in the art.

The repellent contained within the canister 104 and dispensed by the system 100 may comprise metofluthrin, pyrethroid, or another insect repellent or insecticidal substance at known in the art. As is known in the art, the canister 104 may also contain a propellent. The repellent may comprise a liquid phase substance that gasifies as pressure is released thereby expelling itself and other contents of the canister 104 when released. In other embodiments, the canister 104 relies on pressurized air or an insert gas such as nitrogen. In some embodiments, the pressurized gas or propellent is chosen such that the repellent is not degraded within the canister 104 before being released. The contents of the canister 104 (e.g., repellent, carriers, and/or propellent) may be dispersed as an aerosol 107, a cloud, a stream, or in another pattern or form.

Power for operation of the system 100 may be provided via a string light 103. A power cord segment 101 may serve to provide power to the system 100 as well as mechanically linking or suspending the system 100 from/to the string light 103. In operation, the string light 103 may be suspended over an area to be provided light (e.g., a patio or other outdoor space). Integration of the repellent system 100 allows for the space below or near the string light 103 to be provided both light and insect repellency. In operation, the system 100 may provide a periodic spray of repellent. Manual actuation may also be available.

Figure 2:
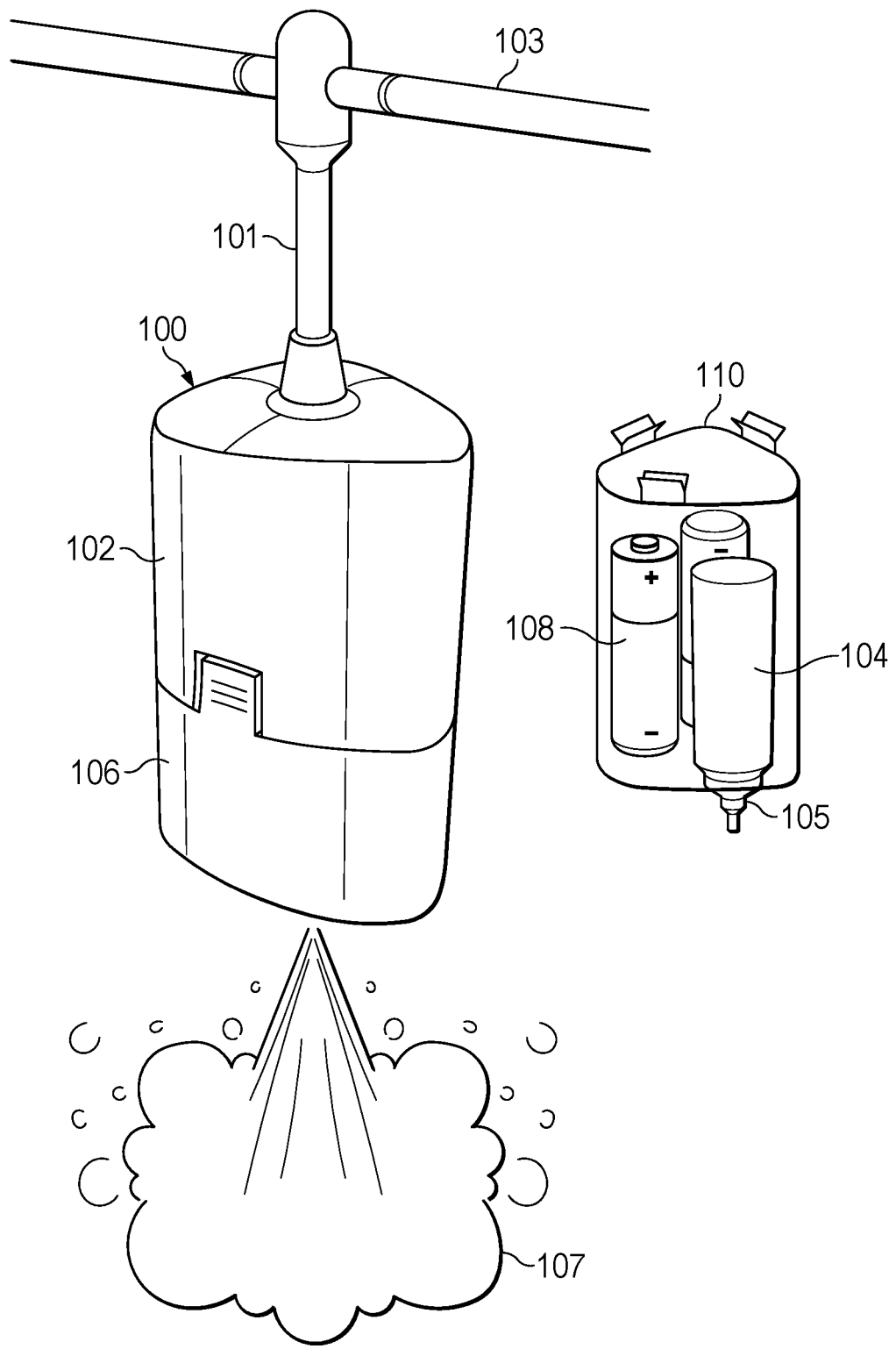
FIG. 2 is a perspective view of another embodiment of an aerosol repellent system according to aspects of the present disclosure.

Referring now to FIG. 2 is a perspective view of another embodiment of the aerosol repellent system 100 according to aspects of the present disclosure is shown. Here the system 100 may remain affixed to the string light system 103 but provided with its own internal power supply instead of, or in addition to, drawing power from the string light system 103. The dispenser 102 may have a removable cap or lower cover 106. A combination refill device 110 may contain both a power supply, such as batteries 108 and the cannister 104. The combination refill device 110 may be exchanged by a user when either the batteries 108 or the cannister 104 becomes depleted. In some embodiments, the combination refill device 110 is provided as an integral unit for convenience. In other embodiments, the combination refill device 110 may have separately serviceable or exchangeable internal components (e.g., batteries 108 and/or cannister 104).

Figure 3:
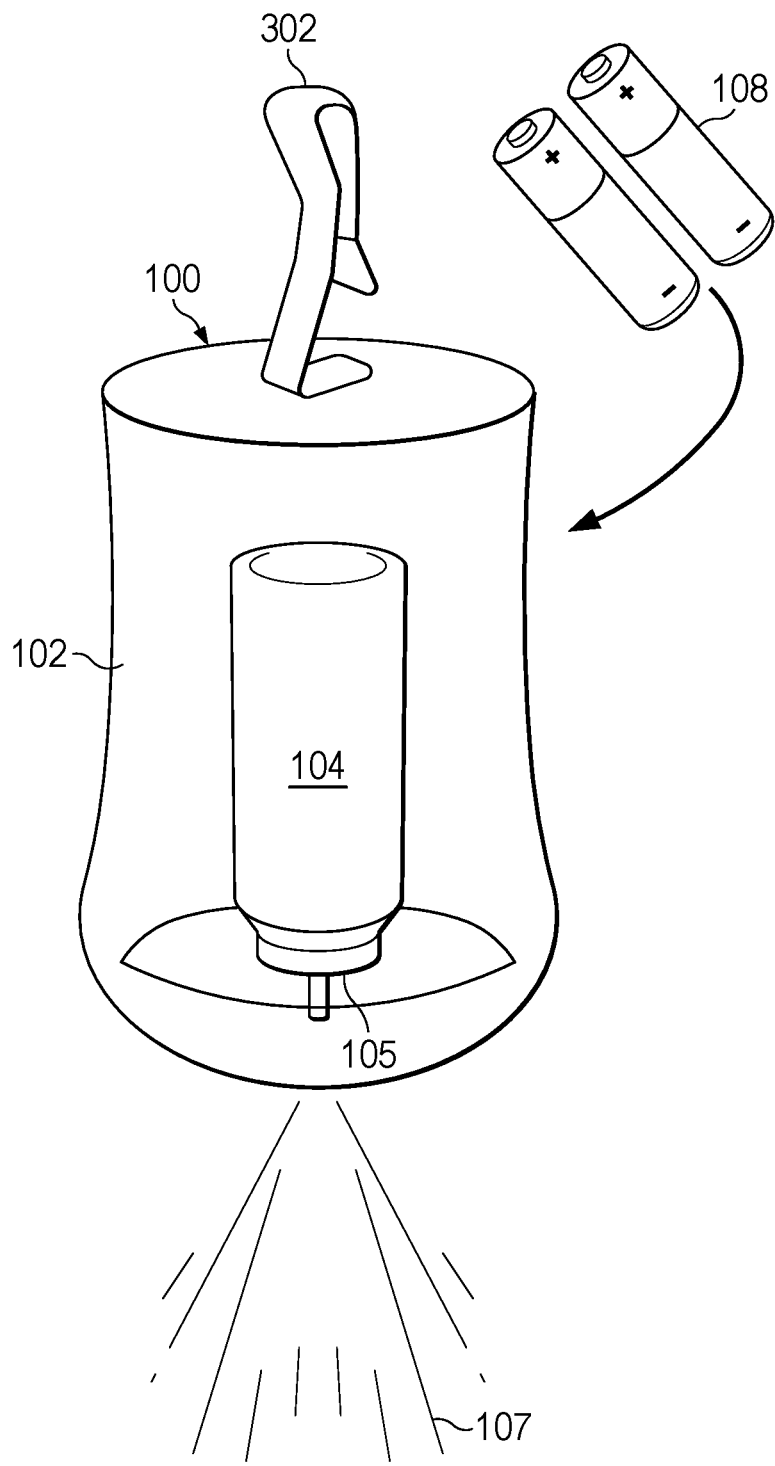
FIG. 3 is a cutaway perspective view of another embodiment of an aerosol repellent system according to aspects of the present disclosure.

Referring now to FIG. 3, a cutaway perspective view of another embodiment of an aerosol repellent system 100 according to aspects of the present disclosure is shown. Here the repellent system 100 is powered only by batteries 108. The batteries 108 and/or cannister 104 may be separately serviceable or replaceable or may comprise an integrated unit (e.g., as with the combination refill device 110). The embodiment of FIG. 3 does not draw power from, nor is it permanently linked to, a light system or other device. Instead, a clip 302 is provided that allows the system 100 to be selectively placed on a string light or other location according to user preference.

Figure 4:
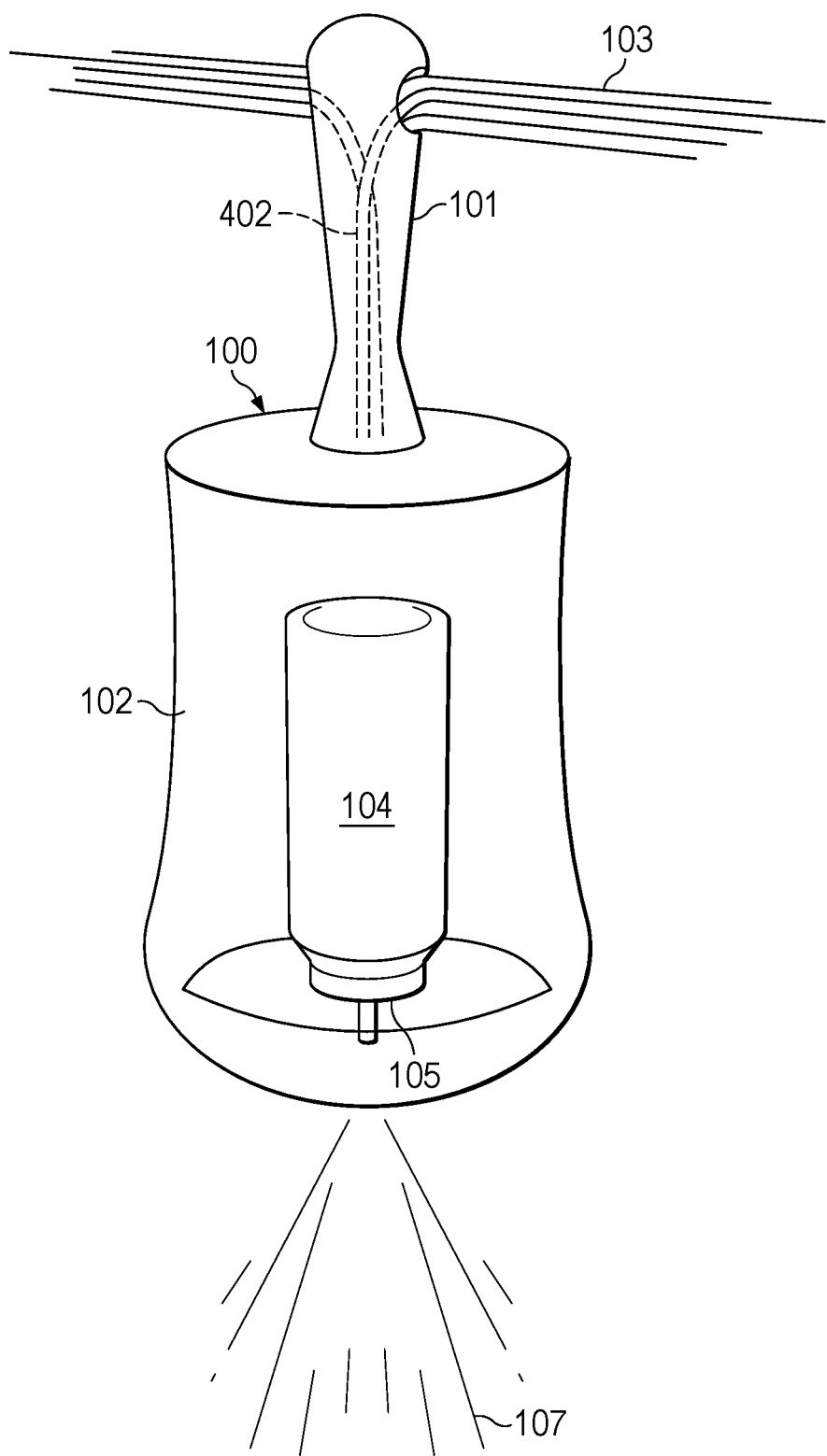
FIG. 4 is a cutaway perspective view of another embodiment of an aerosol repellent system according to aspects of the present disclosure.

Referring now to FIG. 4, is a cutaway perspective view of another embodiment of an aerosol repellent system according to aspects of the present disclosure is shown. Here it is illustrated how the power cord segment 101 may provide a conduit for power leads 402 of the associated string light 103 for powering the repellent system 100.

Figure 5:
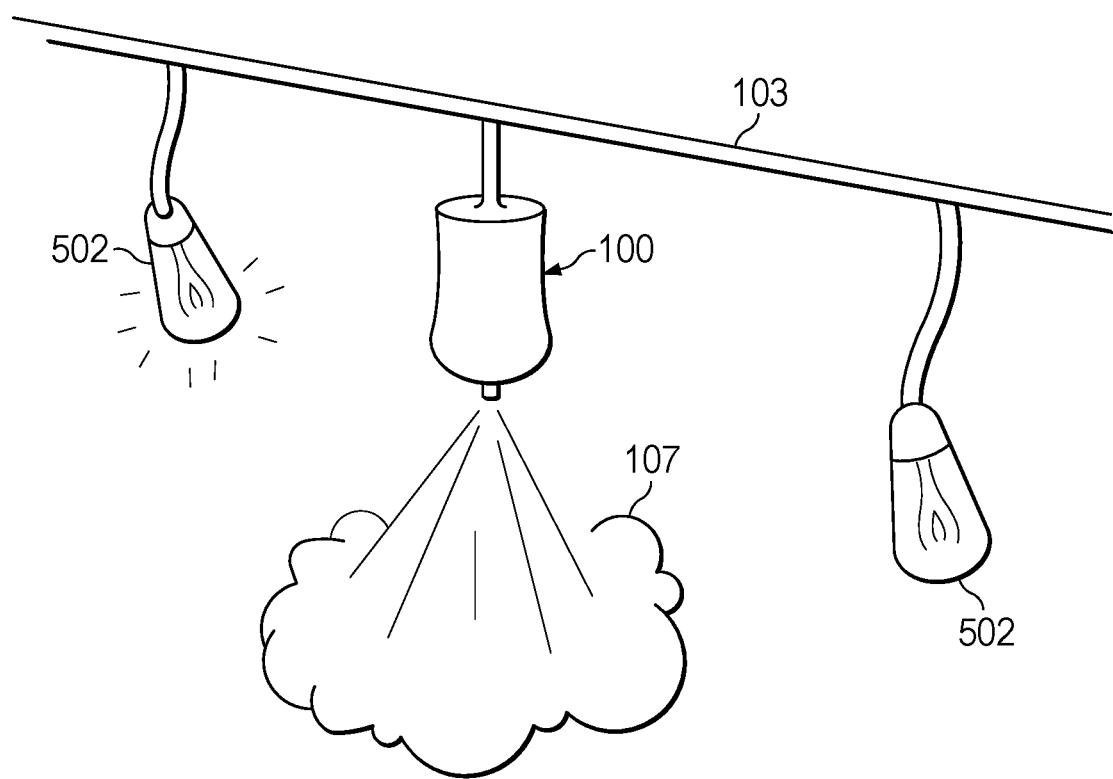
FIG. 5 is a perspective view of an aerosol repellent system according to the present disclosure integrated with a light string.

Referring now to FIG. 5 is a perspective view of an aerosol repellent system 100 according to the present disclosure integrated with a light string 103 is shown. The repellent system 100 provides for dispersion of aerosol insect repellent into an area below or near the string light 103. The string light 103 may provide periodically spaced light bulbs or LED lights 502. Lights 502 may be powered by the string light 103 along with the repellent system 100. Accordingly, in various embodiments, integrated string light and repellent systems are disclosed. The number of lights 502 may vary. Additionally, while only a single repellent system 100 is shown on the string light 103, it should be understood that multiple repellent systems 100 may be integrated with a single string light 103.

Figure 6:
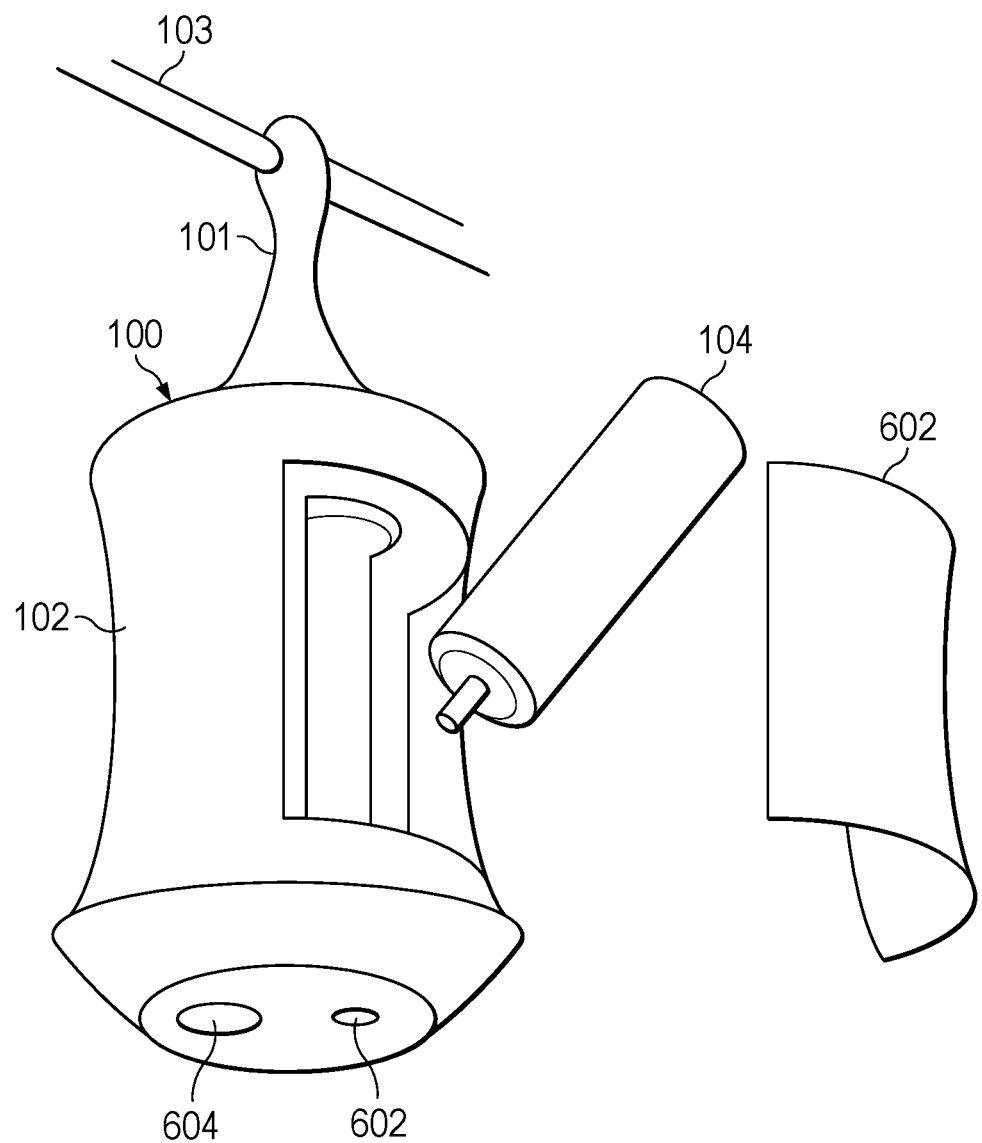
FIG. 6 is a closeup perspective view of an aerosol repellent system according to the present disclosure with access panel open for exchange of aerosol cannister.

FIG. 6 is a closeup perspective view of an aerosol repellent system 100 according to the present disclosure with access panel 602 open for exchange of aerosol cannister 104. The housing 102 may comprise an opening 602, nozzle, or spray tip through which contents of the canister 104 are expelled externally to the housing 102. A power button 604 or other controls and/or sensors may be provided and accessible on the housing 102 as discussed further below.

Figure 7:
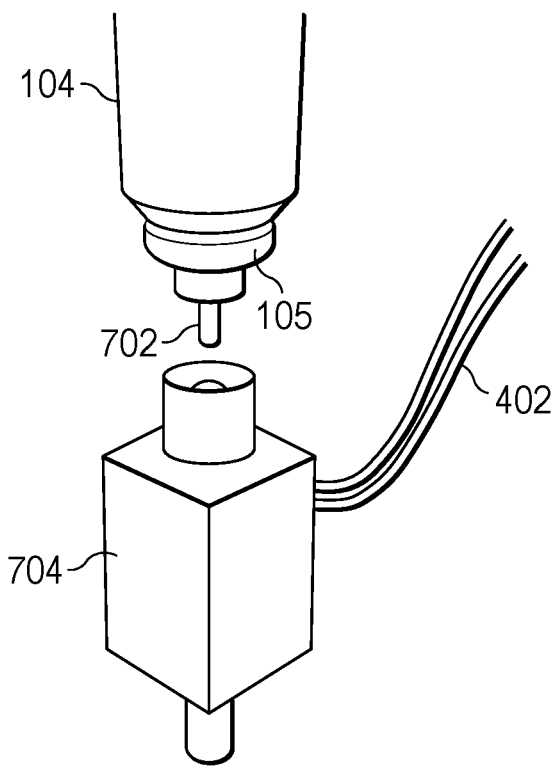
FIG. 7 is a closeup perspective view of an interface between an aerosol cannister and solenoid actuator according to the preset disclosure.

FIG. 7 is a closeup perspective view of an interface between the aerosol cannister 104 and a solenoid actuator 702 according to the preset disclosure. The actuator 704 may be powered by power leads 402, by battery, or other system. Various control systems, such as timing and switching circuitry and the like, may be provided to periodically cause the solenoid 704 to depress a nozzle 702 fitted to the valve 105 associated with the cannister 104 to disperse repellent for a limited duration of time. In another embodiment, the solenoid 704 may disperse a controlled amount of repellent from the cannister 104 more or less continuously while the system 100 is active. In some embodiments, the solenoid 704 is arranged such that contents of the cannister 104 are released or sprayed through the solenoid 704.

Figure 8:
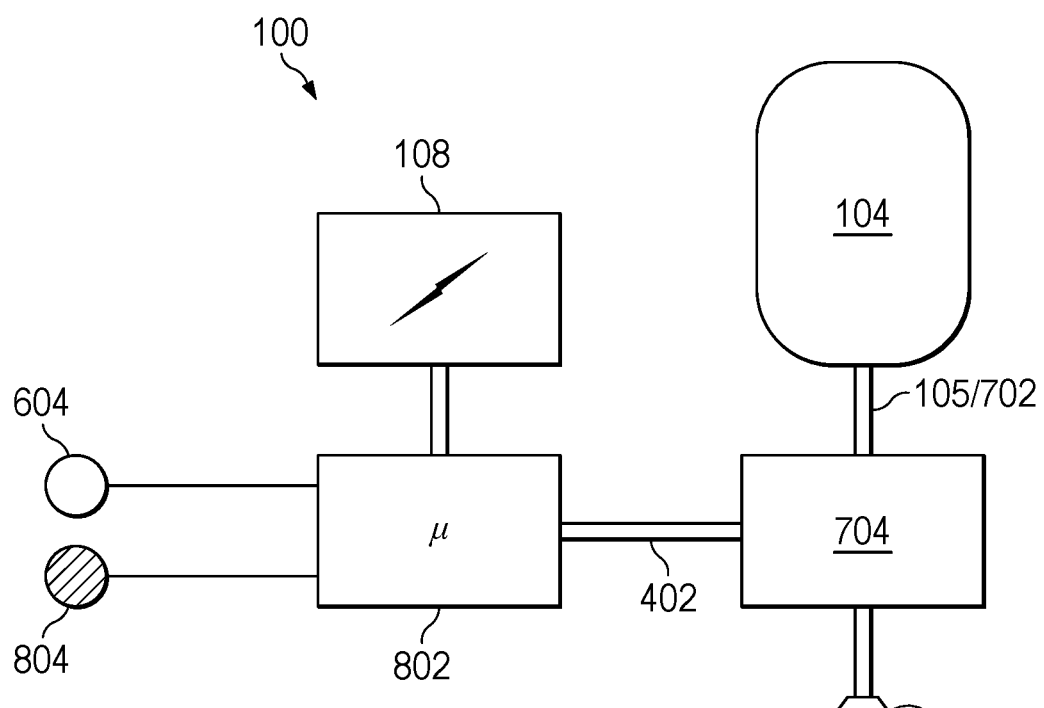
FIG. 8 is a schematic diagram of an aerosol repellent system according to aspects of the present disclosure.

Referring now to FIG. 8 is a schematic diagram of an aerosol repellent system 100 according to aspects of the present disclosure is shown. For simplicity, only internal components are shown. One of skill in the art will appreciate that the external housing an appearance may take many forms. The aerosol cannister 104 can be seen to be fitted to the solenoid 704 via valve 105 and nozzle 702. As described, the solenoid selectively opens and closes or activates the valve 105 to release the internal components (e.g., repellent) from the canister 104. Again, the solenoid 704 may be based on compression of the nozzle 702 to open the valve, rotary activation, or other mechanical action.

A control circuit 802 may activate and deactivated the solenoid 402. The circuit 802 may be silicon or microcontroller based or could be constructed from a suitable analog circuit. Power for the circuit 802, as well as solenoid 704 may come from battery power 108 but could also come from line voltage as described. A user may be provided with an on/off button 604 or other control (e.g., dials, switches, etc.). One or more sensors such as sensor 804 may feed additional information to the control circuit 802. Additional sensors may include, but are not limited to, temperature probes, ambient light sensors, humidity sensors, and wind detectors. These may allow the control circuit 802 to limit or control activation of the solenoid 704 under certain conditions or when certain parameters are met or sensed (e.g., a specified temperature, humidity, wind, or light range). Where a microcontroller or other silicon chip is used for the circuit 802, various programming methods as are known in the art can be utilized to effect the desired operations.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

The term "selective" or "selectively," unless otherwise indicated, is taken to mean that the operation or function is capable of being performed by the structure or device in reference, but the operation or function may not occur continuously or without interruption. Furthermore, a selective or selectively performed operation may be one that the user or operator of a device or method may choose whether or when to perform, but the function or operation is nevertheless fully operative on or within the relevant device, machine, or method and the same includes the necessary structure or components to perform such operation.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A repellent system comprising:
a housing;
an aerosol cannister in the housing containing an insect repellent dispensed via actuation of a valve on the aerosol cannister;
an electrically powered actuator that selectively opens the valve to release repellent;
a power supply;
and a control circuit that energizes the electrically powered actuator with the power supply to cause the electrically powered actuator to open the valve;
wherein the power supply comprises a connection to a string light; and,
wherein the power supply comprises a battery in the housing.

2. The repellent system of claim 1, wherein actuation of a valve comprises pressing of a valve.

3. The repellent system of claim 2, wherein the actuator is a linearly actuating solenoid.

4. The repellent system of claim 3, wherein the control circuit energizes the actuator to open the valve intermittently.

5. The repellent system of claim 1, wherein the repellent comprises metofluthrin.

6. The repellent system of claim 1, further comprising a user control that activates the control circuit.

7. The repellent system of claim 1, further comprising a sensor that causes the control circuit to energize the actuator to open the valve.

* * * * *